United States Patent Office 3,835,085
Patented Sept. 10, 1974

3,835,085
PHOTOCURABLE RAPID DRYING WATER BASE PAINT MADE FROM A POLYENE-POLYTHIOL SYSTEM
Joseph Francis Wrzesinski, Baltimore, Md., assignor to W. R. Grace & Co.
No Drawing. Filed July 31, 1972, Ser. No. 276,286
Int. Cl. C08d 1/00; C08f 1/00
U.S. Cl. 204—159.23                                7 Claims

ABSTRACT OF THE DISCLOSURE

A water based paint useful for protecting and decorating surfaces which can be dried within about 1–30 minutes after being applied to a surface to produce a flat, smooth, gloss, or semigloss finish. This paint can be applied to metal or wooden surfaces as a single finishing coat without first applying a primer coat.

BACKGROUND OF THE INVENTION

This invention is in the field of paint. More particularly it is in the field of rapid drying water based paint useful for protecting and decorating surfaces including metal surfaces and wooden surfaces. Excellent results are obtained when the paint of this invention is applied as a single finish coat to a clean metal or wooden surface without first applying a primer coat.

The paint of this invention can be applied with a paint brush or a roll type applicator; alternatively, said paint can be applied by a conventional spraying technique or from an aerosol bomb (i.e., a pressure spraying bomb).

Paint (including the manufacture and use thereof) is well known to those skilled in the art. An excellent discussion of paint is found on pages 462–485 of Volume 14 of the Second Edition of the Kirk-Othmer Encyclopedia of Chemical Technology, 1967, John Wiley & Sons, Inc.

SUMMARY OF THE INVENTION

In summary, this invention is directed to a composition useful as a paint for protecting surfaces; the composition consisting essentially of: (a) 1 part of a polyfunctional component containing at least two reactive ethylenically or acetylenically unsaturated carbon-to-carbon bonds per molecule (hereinafter "PFC"); (b) about 0.05–0.3 part of a nonionic emulsifier; (c) about 0.01–0.3 part of a pigment; (d) about 0.5–3 parts of water; (e) a quantity of a liquid polythiol component having molecules containing at least two thiol groups per molecule to provide about 0.6–1.1 (preferably about 0.8–1.1 or 0.8–0.95) equivalent of polythiol per equivalent of the PFC, the total functionality of the PFC and the polythiol being greater than 4; and (f) about 0.01–0.25 or 0.05–0.1 part photocuring rate accelerator.

DESCRIPTION OF THE PREFERRED EMBODIMENTS

In preferred embodiments of the invention set forth in the above summary:

1. The polythiol component is present in a quantity to provide about 0.9–1.1 equivalent of polythiol per equivalent of PFC.
2. The photocuring rate accelerator is selected from the group consisting of an aryl aldehyde, a diaryl ketone, an alkyl aryl ketone, a dialkyl ketone, a triaryl phosphine, and a blend of a carbon tetrahalide with a polynuclear aromatic hydrocarbon.
3. The photocuring rate accelerator is benzophenone.
4. The polythiol is pentaerythritol tetrakis (β-mercaptopropionate).

5. The PFC is

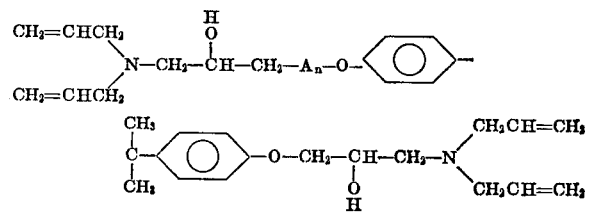

where A is $$-\left[-O-\underset{CH_3}{\underset{|}{\overset{CH_3}{\overset{|}{C}}}}-\phantom{xx}-O-CH_2-\underset{}{\overset{OH}{\overset{|}{C}H}}-CH_2-\right]-$$

and $n$ is 0.20 (more preferably $n$ is greater than 0 and less than 1—having an average value such that the average molecular weight of the PFC is about 560–630). This PFC can be made by the method described in U.S. Pat. No. 3,620,022 (Lard, 260/837 R).

6. The pigment is an organic or inorganic pigment passing about a 200 mesh screen or a 325 mesh screen. Larger particles can be used with excellent results if the pigment is water soluble.

DETAILED DESCRIPTION OF THE INVENTION

It is an object of this invention to provide a rapid drying (or rapid curing) water based paint excellently adapted for protecting and decorating surfaces.

It is another object of this invention to provide a rapid drying (rapid curing) water based paint excellently adapted for protecting and decorating surfaces, including wooden and metal surfaces even when applied thereto as a single coating in the absence of a primer coating.

It is another object to provide a rapid drying (rapid curing) water based paint composition adaptable to produce a flat, smooth, gloss, or semigloss surface when applied to a surface.

It is another object of this invention to provide a photocurable composition useful as a rapid drying (rapid curing) water based paint adapted to improve the appearance of and to protect surfaces which can be readily cured by exposure to sunlight or any actinic radiation having a wavelength of about 3000–4000 A. for about 2–60 minutes or less or for about 5–30 minutes.

Still other objects will be readily apparent to those skilled in the art.

The following U.S. Patents, teaching PFCs (polyfunctional components containing at least two reactive ethylenically or acetylenically unsaturated carbon-to-carbon bonds per molecule), polythiol components containing at least two thiol groups per molecule, photocuring rate accelerators and photocuring compositions comprising (or consisting essentially of admixtures of such polyfunctional components, such polythiols, and such photocuring rate accelerators are incorporated herein by reference:

1. Pat. No. 3,615,450, Werber et al., 96/35.1.
2. Pat. No. 3,645,730, Frank et al., 96/28.
3. Pat. No. 3,537,853, Wessells et al., 96/35.1.
4. Pat. No. 3,535,193, Prince, 161/88.
5. Pat. No. 3,661,744, Kehr et al., 204/159.14.
6. Pat. No. 3,578,614, Wszolek, 260/13.
7. Pat. No. 3,661,088, Lundsager, 96/36.
8. Pat. No. 3,662,022, Lard, 260/837 R.
9. Pat. No. 3,662,023, Kehr et al., 260/858.

Nonionic emulsifiers are well known to those skilled in the art. A large number of such emulsifiers, which can be used with excellent results in preparing the photocurable paint of this invention, are described on pages 127–131 of Volume 8 of the Second Edition of the Kirk-Othmer "Encyclopedia of Chemical Technology" (1969). The Pluronic emulsifiers (condensation products of ethylene oxide and polypropylene glycol), especially Pluronic F-88, preferred emulsifiers for use in preparing the paint of this invention.

The paint of the instant invention can be pigmented with any pigment—especially the well known, commercially available pigments presently being used in commercial paints including, but certainly not limited to, carbon black, $TiO_2$, zinc oxide, calcium carbonate, iron oxide and the like. In the instant invention, pigmentation can also be accomplished by adding a covering agent such as finely divided (e.g., minus ca. 200 mesh or minus 325 mesh) calcium carbonate, barium sulfate, talc, clay, mica, $TiO_2$, ZnO, $SiO_2$, or $Al_2O_3$ in combination with an organic dye (e.g., Azosol Black manufactured by General Aniline and Film, Linden, New Jersey or those listed in the following tables).

Water soluble and water insoluble dyes can be used with excellent results.

As used herein the term "pigment" includes any dye or pigment having a Colour Index Number falling within 10,000 and 77,999, and mixtures comprising a dye having a Colour Index Number between 10,000 and 76,999 admixed with a covering agent including, but not limited to, the above-named covering agents Dyes and pigments which are useful in the process of this invention and in the preparation of the composition of this invention include those organic dyes of the types (Colour Index Numbers falling within 10,000 to 77,999) listed in the table (reproduced below as Table I) which occurs on the first page of the Preamble to Part II (in Volume 3) of the Second (1956) Edition of the Colour Index.

Excellent results can be obtained where using mordant dyes. Phthalocyanine blue is a preferred dye or pigment for use in preparing the rapid drying water based paint of my invention.

TABLE I[1]

Classification of Dyes & Pigments

| | C.I. Numbers |
|---|---|
| Nitroso | 10000–10299 |
| Nitro | 10300–10999 |
| Monoazo | 11000–19999 |
| Disazo | 20000–29999 |
| Trisazo | 30000–34999 |
| Polyazo | 35000–36999 |
| Azoic | 37000–39999 |
| Stilbene | 40000–40999 |
| Diphenylmethane | 41000–41999 |
| Triarylmethane | 42000–44999 |
| Xanthene | 45000–45999 |
| Acridine | 46000–46999 |
| Quinoline | 47000–47999 |
| Methine | 48000–48999 |
| Thiazole | 49000–49399 |
| Indamine | 49400–49699 |
| Indophenol | 49700–49999 |
| Azine | 50000–50999 |
| Oxazine | 51000–51999 |
| Thiazine | 52000–52999 |
| Sulfur | 53000–54999 |
| Lactone | 55000–55999 |
| Aminoketone | 56000–56999 |
| Hydroxyketone | 57000–57999 |
| Anthraquinone | 58000–72999 |
| Indigoid | 73000–73999 |
| Phthalocyanine | 74000–74999 |
| Natural | 75000–75999 |
| Oxidation Bases | 76000–76999 |
| Inorganic Pigments | 77000–77999 |

[1] This table is from the first page of the Preamble To Part II of the Second (1956) Edition of the Colour Index.

Pages 495–589 of Volume 15 of the Kirk-Othmer Encyclopedia of Chemical Technology, second edition (1968) lists a large number of pigments (both inorganic and organic which can be used with excellent results in preparing the paint of this invention.

Among the preferred pigments are:

TABLE II titanium dioxide
basic carbonate white lead
basic sulfate white lead
basic silicate white lead
zinc oxide ("zinc white")
zinc sulfide
lithopone
antimony trioxide
calcium carbonate ("whitings")
gypsum
magnesium silicate
magnesium carbonate
china clays
mica
complex aluminum silicates
silica including diatomaceous earth
barium sulfate
iron oxide pigments including hemitite,
burnt sienna, pyrites, cinder, bauxite-
residue red, and synthetic iron oxide
pigments (including synthetic brown iron
oxides)
red lead
orange mineral
cadmium reds
cadmium maroons
cadmium yellows
cuprous oxide
cinnabar
raw umber
metallic browns (mineral browns)
manganese brown
Van Dyke brown
chrome yellows
chrome oranges
molybdenum oranges
zinc yellow
nickel titanate
chrome greens (Brunswick greens)
chromium oxide greens
hydrated chromium oxide
iron blues
ultramine blues
blue basic lead sulfate
carbon blacks
lampblacks
vegetable blacks
animal blacks
graphite
channel black pigments
furnace blacks
aluminum powder
bronze powder
zinc dust

TABLE III

| | |
|---|---|
| pigment yellow 1 | pigment red 2 |
| pigment yellow 3 | pigment red 3 |
| pigment yellow 12 | pigment red 4 |
| pigment yellow 13 | pigment red 5 |
| pigment yellow 14 | pigment red 6 |
| pigment yellow 17 | pigment red 17 |
| pigment orange 1 | pigment red 18 |
| pigment orange 5 | pigment red 22 |
| pigment orange 13 | pigment red 23 |
| pigment orange 16 | pigment red 38 |
| pigment red 1 | pigment red 48 |

TABLE III—Continued

| pigment red 49 | pigment blue 1 |
| pigment red 52 | pigment blue 2 |
| pigment red 53 | pigment blue 9 |
| pigment red 54 | pigment blue 14 |
| pigment red 57 | pigment blue 15 |
| pigment red 60 | pigment blue 19 |
| pigment red 63 | pigment blue 24 |
| pigment red 81 | pigment green 1 |
| pigment red 83 | pigment green 2 |
| pigment red 90 | pigment green 4 |
| acid red 26 | pigment green 7 |
| pigment violet 1 | pigment green 8 |
| pigment violet 3 | natural black 3 |
| pigment violet 5 | |

Pigment lakes using an organic pigment and an adsorbing substrate (e.g., alumina hydrate or silica) have also been used with excellent results.

Where using a vat dye pigment (or any other pigment having a colorless and a colored form) the pigment is used in its colored form.

Where preparing a rapid drying (photocurable) paint of the instant invention I have usually followed a procedure comprising:

1. Forming a first mixture by admixing 1 part of a PFC with about 0.05–0.3 part of a nonionic surfactant.

2. Adjusting the temperature of the first mixture to about 70–95° C. (if it is not already within this temperature range); vigorously agitating (e.g., stirring at a rapid rate) the first mixture and adding hot (ca. 70–95° C.) water thereto while vigorously agitating the resulting second mixture and maintaining it at about 70–95° C. The water is added in increments of about 0.1 to 0.3 part per part of the PFC until a total of about 0.5–3 parts of water per part of the PFC has been added over a period of about 0.5–2 hours.

3. Maintaining the second mixture at about 70–95° C. and agitating it vigorously while adding the aforesaid polythiol thereto in an amount to provide, in the resulting fourth mixture about 0.6–1.1 equivalent of polythiol per equivalent of PFC, and continuing to agitate the resulting third mixture vigorously while maintaining said third mixture at about 70–95° C.

4. Mainaining the third mixture at about 70–95° C. and agitating it vigorously while adding the aforesaid pigment thereto, the pigment being added as finely divided (e.g., ca. minus 200 mesh or minus 325 mesh) particles while continuing to agitate the resulting fourth mixture and while maintaining its temperature at about 70–95° C. (If water soluble the pigment can be dissolved in and added with the water.) If added as a solid, the pigment should preferably be added in increments of about 0.001–0.01 parts per part of the PFC until a total of about 0.01–0.3 part of pigment per part of PFC has been added over a period of about 0.2–2 or 3 hours. Vigorously agitating the resulting fourth mixture while maintaining it at about 70–95° C.

5. Maintaining the fourth mixture at about 70–95° C. and agitating it vigorously while adding thereto about 0.01–0.25 part (most preferably 0.05–0.1 part) of the photocuring rate accelerator, said rate accelerator being added in the liquid or molten state, per part of the polyfunctional component while vigorously agitating the resulting fifth mixture and maintaining it at about 70–95° C.

6. Cooling the fifth mixture (the rapid drying photocurable paint of my invention) to about 20–30° C. (preferably over a period of about 0.5–2 hours) while continuing to agitate it.

While the above procedure is the preferred method for preparing my water based rapid drying paint composition it is not the only procedure by which said composition can be prepared. For example: (a) the photocuring rate accelerator can be added as a fine powder (e.g., minus ca. 200 mesh or finer) or it can be dispersed in the water and added with the water; (b) the polythiol can be admixed with the system before or after adding the water; (c) if the PFC and the polythiol are admixed before the water is added the polythiol can be admixed into the system or after the surfactant is admixed into the system; (d) the emulsifier must be present in the system when the water is added thereto; and (e) the wax can be added before or after adding the polythiol.

Various other modifications will, because of my disclosure, be readily apparent to those skilled in the art. I have found that it is important that the water be added to a mixture comprising at least the PFC and the emulsifier rather than; (a) adding the PFC and the emulsifier to the water; (b) adding the PFC to a mixture comprising the water and the emulsifier. I have also found that it is important that the mixture to which the water is added should contain the emulsifier and be agitated vigorously while adding the water thereto.

One skilled in the art can readily determine the degree of agitation which is sufficiently vigorous for this purpose because the desired product (an aqueous emulsion of the PFC) will not form if agitation is not sufficiently vigorous. It is also important that the water be added in relatively small increments (ca. 0.1–0.3 part per part of the polyfunctional component) because if too much water is added at one time (or if the increments are added too close together) the desired product (said emulsion) will not form. Because of my disclosure one skilled in the art can readily determine the proper increment size and the proper period of time between increments. Alternatively, the second mixture can be formed by slowly adding the water as a small continuously flowing stream.

Because of my disclosure, it will be readily apparent to those skilled in the art that, after incorporating the photocuring rate accelerator and the polythiol therein the composition must be protected from exposure to sunlight or other actinic or free radical generating radiation because, once the PFC, the polythiol, and the photocuring rate accelerator are all present in the composition, the composition will cure (polymerize) on exposure to such light or radiation.

The paint of the instant invention can be applied in any manner used to apply ordinary paint including application with a brush, a roller, an aerosol bomb type applicator, a conventional paint sprayer, or by dipping.

While the thickness of a coat of the paint of the instant invention can vary from about 0.5 mil or less to about 6 mils or thicker or thinner, I generally prefer to apply a coating about 1–3 mils thick (dry thickness). While a plurality of coats of said paint can be applied, I have found that, in most instances a single coat is sufficient. Where using a plurality of coats I cure each coat (e.g., by exposure to the sun or to another source of actinic radiation) before applying a subsequent coat of said paint thereto. I have found that where using the rapid drying water based paint of my invention on metal surfaces or on wooden surfaces the use of a primer coating is not necessary.

The instant invention will be better understood by referring to the following specific but nonlimiting examples. It is understood that said invention is not limited by these examples which are offered merely illustrations; it is also understood that modifications can be made without departing from the spirit and scope of the invention.

Example 1

A tetraene having the formula

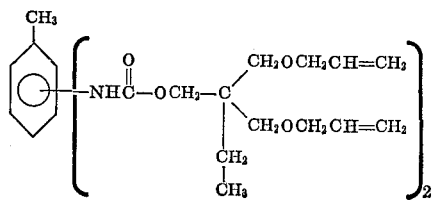

was prepared by admixing 2 moles of trimethylol propane diallyl ether and 0.2 g. of dibutyl tin dilaurate as a catalyst in a resin kettle. The mixture was kept therein under nitrogen. The resin kettle was equipped with a stirrer, thermometer, dropping funnel, and a gas inlet and outlet. 1 mole of toluene diisocyanate was added slowly with stirring and the reaction temperature was maintained at 70° C. by means of a water bath. After addition of the toluene diisocyanate, the reaction continued for about 1 hour at 70° C. until the —NCO content was substantially zero. The thus formed tetra-allyl terminated liquid product was designated "Product 1."

Example 2

A diene having the formula

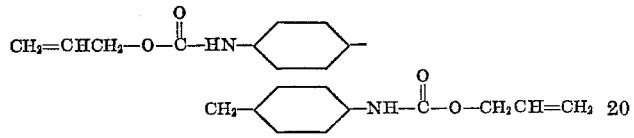

was prepared by reacting allyl alcohol with a stoichiometric quantity of 4,4'-dicyclohexylmethane diisocyanate (2 moles of the alcohol per mole of the diisocyanate) in the presence of 0.2 g. of dibutyl tin dilaurate catalyst in a resin kettle while maintaining the reacting mass under an atmosphere of nitrogen. The resulting diene (which was a solid melting at 93° C.) was designated "Product 2."

Example 3

A tetraene designated "Product 3" was prepared by the following method:

Five moles of Epon 828 (an epoxy compound obtained from Shell Chemical Co.) having the formula

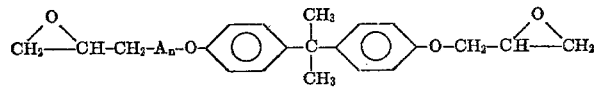

where A is

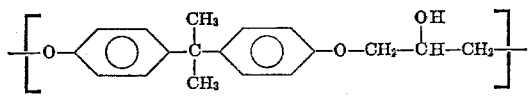

and $n$ is a number greater than 0 and less than 1 and having an average value such that the average molecular weight of the epoxy compound is about 390 and twelve moles of diallylamine were admixed under an atmosphere to nitrogen and maintained at about 80–90° C. (under said atmosphere to nitrogen) for about 2–3 hours. Then unreacted diallyl amine was distilled off under reduced pressure (ca. 1–10 mm. of mercury absolute) and the residue (substantially pure Product 3) was recovered.

Example 4

A 100 g. portion of Product 3 (the tetraene prepared in Example 3) was heated to about 90° C. and 20 g. of Pluronic F88 (a nonionic emulsifier resulting from the action of ethylene oxide and polypropylene glycol) was added thereto to form a first mixture. The first mixture was stirred vigorously and 150 g. of water having a temperature of about 90° C. was added thereto in about 15 ml. increments over a period of about an hour while vigorously stirring the first mixture and the resulting second mixture and while maintaining the temperature thereof about 90° C. A 6 g. portion of phthalocyanine blue was added to the second mixture while vigorously stirring the second mixture and the resulting third mixture and while maintaining the temperature thereof at about 90° C. A 50 gram portion of pentaerythritol tetrakis (β-mercaptopropionate) was added to the third mixture while vigorously stirring the third mixture and the resulting fourth mixture and while maintaining the temperature thereof at about 90° C. A 2 g. portion of molten benzophenone (a photocuring rate accelerator) was added to the fourth mixture while vigorously stirring the fourth mixture and the resulting fifth mixture and while maintaining the temperature thereof at about 90° C. While stirring the fifth mixture it (the fifth mixture) was cooled from about 90° C. to about 25° C. over a period of about 2 hours. The thus formed paint (which was designated "Product 4") was packaged in a light proof container and the container was closed with a light proof closure.

Example 5

A single coating of Product 4 was applied to an unprimed piece of wood (a 2 ft. x 6 in. fir board) with a paint brush and cured by exposure for about 5 minutes with a 260 watt ultraviolet light (ca. 2 feet from the board).

A similiar board from the same lot was painted with a commercially available urethane exterior paint. The urethane coating dried in about 2 hours, whereas, as noted supra, the coating of Product 4 dried (was cured) on about 5 minutes' exposure to ultraviolet light.

Each board was sawed into several pieces and the coatings on the resulting test pieces were tested for resistance to alcohol, chloroform, concentrated sulfuric acid, concentrated nitric acid, and 12 molar hydrochloric acid—the test being run at room temperature (ca. 25° C.). In each instance the dried urethane coating wrinkled within 15–20 minutes or less which the coating of dried (cured) coating of Product 4 remained unchanged after 5 hours.

All surfaces of a test strip (ca. 6 inches x 2 inches x 1 inch) of unprimed fir lumber were coated (using a paint brush) with a coating of Product 4 which was cured (dried) as above to produce a dry (cured) coating about 2 mils thick. The thus prepared and coated test strip was immersed in a hot (ca. 80° C.) mixture of equal volumes of concentrated nitric and sulfuric acids. The coating of paint (cured Product 4) was not affected after 2 hours contact with the hot acid mixture. A similar strip coated with the above-mentioned urethane paint and then air dried for 5 hours to produce a dry coating about 4 mils thick was subjected to the same test. The dried urethane paint coat decomposed within less than 20 seconds in the hot (ca. 80° C.) bath of nitric and sulfuric acids.

Example 6

The general procedure used to prepare Product 4 was repeated. However, in this instance the procedure was modified by heating the tetraene "Product 3" to 80° C. (rather than to 90° C.) and conducting the subsequent steps at 80° C. rather than at 90° C. The resulting paint was subjected to the tests described in Example 5, supra, and the results obtained were indistinguishable from those of Example 5.

EXAMPLE 7

The general procedure used to prepare Product 4 was repeated. However, in this instance the procedure was modified by replacing the tetraene (Product 3) used in Example 4 with the tetraene (Product 1) prepared in Example 1. In this instance 80 g. of pentaerythritol tetrakis (β-mercaptoproptionate) was used.

The resulting product (Product 7) was a sprayable photo-curable paint of high quality excellently adapted for painting metal surfaces and wooden surfaces including furniture.

EXAMPLE 8

The general procedure of Example 7 was repeated. However, in this instance the pentaerythritol tetrakis (β-mercaptopropionate) was replaced with 90 g. of ethylene glycol (β-mercaptopropionate).

The resulting product (Product 8) was a sprayable photocurable paint of high quality excellently adapted for use as a paint for metal surfaces and wooden surfaces including furniture.

EXAMPLE 9

The general procedure of Example 4 was repeated. However, in this instance the procedure was modified by replacing the tetraene (Product 3) used in Example 4 with the diene (Product 2) prepared in Example 2. In this instance 64 g. of pentaerythritol tetrakis (β-mercaptopropionate) was used.

The resulting product (Product 9) was a sprayable photocurable paint of high quality excellently adapted for use as a paint for metal surfaces and wooden surfaces including furniture.

In other runs using the general procedure of Example 4 and using care to so match the polyfunctional component and polythiol so that the total functionality (the functionality of the polyfunctional component having at least two reactive ethylenically or acetylenically unsaturated carbon-to-carbon bonds and the polythiol component) which is greater than 4:

1. Product 1 (the polyfunctional component (or compound) containing at least two reactive ethylenically or acetylenically unsaturated carbon-to-carbon bonds per molecule( which was used in Example 4 was replaced with each of the polyfunctional components containing molecules having at least two reactive ethylenically or acetylenically unsaturated carbon-to-carbon bonds per molecule which are taught in the following U.S. Pats.:

a. Pat. No. 3,615,450, Werber et al., 96/35.1.
b. Pat. No. 3,645,730, Frank et al., 96/28.
c. Pat. No. 3,537,853, Wessells et al., 96/35.1.
d. Pat. No. 3,535,193, Prince, 161/88.
e. Pat. No. 3,661,744, Kohr et al., 204/159.14.
f. Pat. No. 3,578,614, Wszolek, 260/13.
g. Pat. No. 3,660,088, Lundsager, 961/36.
h. Pat. No. 3,662,022, Lard, 260/837 R.
i. Pat. No. 3,662,023, Kehr et al. 260/858.

2. The polythiol (pentaerythritol tetrakis β-mercaptopropionate) which was used in Example 4 was replaced with each of the polythiol components having molecules containing at least two thiol groups per molecule which are taught in said above-mentioned patents.

3. The benzophenone (photocuring rate accelerator) used in Example 4 was replaced with the photocuring rate accelerators taught in said above-mentioned U.S. Pats. using amounts of photocuring rate accelerator varying from about 0.01 to about 0.25 (especially 0.05–0.1) part of photocuring rate accelerator per part of polyfunctional component containing at least 2 reactive ethylenically or acetylenically unsaturated bonds per molecule.

4. The emulsifier used in Example 4 was replaced with the nonionic emulsifiers listed on pages 128–130 of volume 8 of the Second Edition (1965) of Othmer, "Encyclopedia of Chemical Technology." These runs were made using 0.05, 0.08, 0.1, 0.2 and 0.3 part of emulsifier per part of PFC.

5. The pigment of Example 4 was replaced with each of the pigments listed supra. These runs were made using 0.01, 0.05, 0.1, 0.2, and 0.3 parts of pigment per part of PFC.

6. The quantity of water was varied using 0.5, 1, 2, and 3 parts of water per part of the polyfunctional compound containing at least two ethylenically or acetylenically unsaturated bonds per molecule.

Said runs were made using quantities of PFC and polythiol to provide 0.6, 0.7, 0.8, 0.9, 0.95, 1 and 1.1 equivalent of polythiol per equivalent of PFC, and in each run the total functionality of the polyene (polyfunctional compound) and the polythiol was greater than 4.

In each of the above-mentioned runs the product was a sprayable photocurable paint which could also be applied with a brush or roll and which was excellently adapted for painting metal or wooden surfaces.

As used herein the term polyene and the term polyyne refer to single or complex species of alkenes or alkynes, solid or liquid at or below 70° C., having a multiplicity of terminal reactive carbon-to-carbon unsaturated functional groups per average molecule. For example, a diene is a polyene that has two reactive carbon-to-carbon double bonds per average molecule, while a diyne is a polyyne that contains in its structure two reactive carbon-to-carbon triple bonds per average molecule. Combinations of reactive double bonds and reactive triple bonds within the same molecule are also possible such as for monovinylacetylene which is a polyeneyne under this definition. For purposes of brevity all these classes of compounds are referred to herein as polyenes.

The term "functionality" as used herein refers to the average number of reactive ene (or yne) or thiol group per molecule in the polyene (or polyyne) or polythiol, respectively. For example, a triene is a polyene with an average of three reactive carbon-to-carbon unsaturated groups per molecule and thus has a functionality of three. A dithiol is a polythiol with two thiol groups per molecule and the thus has a functionality of two. A trithiol has a functionality of three, and a tetrathiol has a functionality of four. A diene has a functionality of two, and a tetraene a functionality of four.

It is to be understood that the functionality of the polyene and the polythiol component is commonly expressed in whole numbers although in practice the actual functionality may be fractional. For example, a polyene component having a nominal functionality of two (from theoretical considerations alone) may in fact have an effective functionality of somewhat less than two.

As used herein the term "reacting" as applied to polyfunctional compound or component (i.e., a polyene or a polyyne) containing at least two ethylenically or acetylenically unsaturated carbon-to-carbon bonds per molecule means that the unsaturated carbon-to-carbon bonds will react under the conditions as set forth with thiol groups to yield the thioether linkage

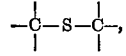

as contrasted to the term unreactive carbon-to-carbon unsaturation which means

groups found in aromatic nuclei (cyclic structures exemplified by benzene, pyridene, anthracene, and the like) which do not under the same conditions react with thiols to give thioether linkages.

The term "equivalent" as applied to a polythiol means that quantity of the polythiol which contains 33.07 grams of —SH group. Thus, an equivalent of pentaerythritol tetrakis (β-mercaptopropionate is ¼ mole of said mercaptopropionate because each molecule of said mercaptopropionate contains 4 —SH groups (i.e., a mole of this compound contains 132.28 grams of —SH).

In a polythiol compound having the formula

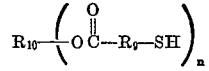

an equivalent is ½ mole where $n$ is 2; ⅓ mole where $n$ is 3, ¼ mole where $n$ is 4, and ⅕ mole where $n$ is 5. As noted supra the term "reactive ethylenically or acetylenically unsaturated group" means a group (having olefinic or acetylinic carbon-to-carbon unsaturation) which will react under proper conditions as set forth herein with thiol groups to yield a thioether linkage

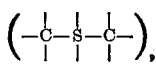

as contrasted to the term "unreactive carbon-to-carbon unsaturation" which means

groups found in aromatic nucleii (cyclic structures exemplified by benzene, pyridine, anthracene, and the like) which do not under the same conditions react with thiols to give thioether linkages.

The term "equivalent" as applied to a compound having reactive olefinic or acetylenic unsaturation means that quantity of the compound which contains one reactive olefinic double bond or one reactive acetylenic triple bond. Thus, if a compound contains two such bonds an equivalent of said compound is ½ mole of said compound, while an equivalent of a compound containing 3 such bonds is ⅓ mole, and an equivalent of a compound containing 4 such bonds is ¼ mole.

As used herein, the term "percent (%)" means parts per hundred and the term "parts" means parts by weight unless otherwise defined where used.

As used herein, the term "mole" has its generally accepted meaning, that is, a mole of a substance is that quantity of the substance which contains the same number of molecules of the substance as there are atoms of carbon in 12 grams of pure $^{12}$C.

As used herein, the term "g." means gram or grams.
As used herein, the term "A." means Angstrom units.
As used herein, the term "mesh," as applied to screen size, means U.S. standard.
As used herein, the term "ml." means milliliter or milliliters.
As used herein, the term "mil" means 0.001 inch; thus, 10 mils is 0.01 inch and 100 mils is 0.1 inch.

I claim:
1. A paint consisting essentially of;
 (a) 1 part of a polyfunctional compound having the formula

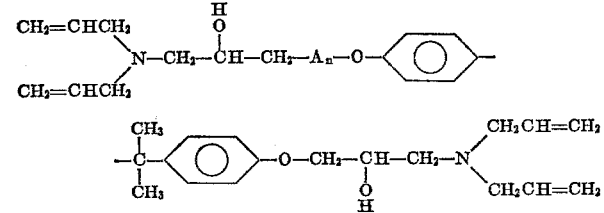

wherein A is

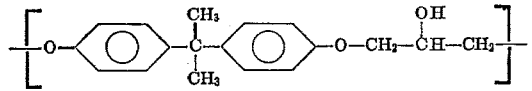

and
 $n$ has an average value such that the average molecular weight of the polyfunctional component is about 560–630;
 (b) 0.05–0.3 part of a nonionic emulsifier;
 (c) 0.01–0.3 part of a pigment passing a 200 mesh screen;
 (d) 0.5–3 parts of water;
 (e) a quantity of a liquid polythiol component having molecules containing at least two thiol groups per molecule to provide about 0.6–1.1 equivalent of polythiol per equivalent of the polyfunctional component, the total functionality of the polyfunctional compound and the polythiol being greater than 4; and
 (f) 0.01–0.25 part of a photocuring rate accelerator.

2. The paint of Claim 1 in which the polythiol component is present in a quantity to provide about 0.9–1.1 equivalents of polythiol per equivalent of polyfunctional component.

3. The paint of Claim 1 in which the photocuring rate accelerator is selected from the group consisting of an aryl aldehyde, a diaryl ketone, an alkyl aryl ketone, a triaryl phosphine, and a blend of a carbon tetrahalide with a polynuclear aromatic hydrocarbon.

4. The paint of Claim 1 in which the photocuring rate accelerator is benzophenone.

5. The paint of Claim 1 in which the polythiol is pentaerythritol tetrakis (β-mercaptoproprionate).

6. The paint of Claim 1 in which the pigment is an organic or inorganic pigment passing about a 200 mesh screen or a 325 mesh screen.

7. The paint of Claim 1 in which there is present about 0.02–0.05 part of photocuring rate accelerator per part of the polyfunctional component.

References Cited

UNITED STATES PATENTS 3,661,744    5/1972    Kehr et al. _____ 204—154.14
3,328,325    6/1967    Zdanowski _____ 260—22

RICHARD B. TURER, Assistant Examiner

U.S. Cl. X.R.

96—115 P; 117—93.31, 132 B, 132 R, 148; 204—159.15, 159.18, 159.24; 260—28, 28.5 R, 29.7 SQ, 29.7H, 41 A, 41 C, 41 R, 77.5 AP, 77.5 R, 79, 79.5 GN, 79.5 NV, 836, 837 R